United States Patent
Monga

(10) Patent No.: US 11,811,566 B2
(45) Date of Patent: Nov. 7, 2023

(54) METHODS AND SYSTEMS FOR PERFORMING ADAPTIVE EQUALIZATION OF DATA

(71) Applicant: Samsung Electronics Co., Ltd., Suwon-si (KR)

(72) Inventor: Sushrant Monga, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/830,399

(22) Filed: Jun. 2, 2022

(65) Prior Publication Data

US 2023/0308314 A1    Sep. 28, 2023

(30) Foreign Application Priority Data

Mar. 22, 2022    (IN) .............................. 202241015792

(51) Int. Cl.
*H04L 25/03*    (2006.01)
*H04L 25/02*    (2006.01)

(52) U.S. Cl.
CPC .... *H04L 25/03019* (2013.01); *H04L 25/0212* (2013.01)

(58) Field of Classification Search
CPC ......... H04L 25/03057; H04L 25/03885; H04L 25/03878; H04L 7/033; H04L 25/03146; H04L 25/0272; H04L 7/0087; H04L 27/01; H04L 25/03019; H03L 7/0807; H03L 7/093; H03L 7/087; H03L 7/081; H03L 7/07; H03L 2207/06; H03L 7/091; H04B 1/7115; H04B 1/7117; H04B 2201/7071; H04B 7/005; H04B 1/7105; H04B 10/2507; H03H 21/0012; H03H 21/0043; H03H 17/02; H03H 7/30; H03H 15/00; H03H 2017/0298
USPC .......................................................... 375/232
See application file for complete search history.

(56) References Cited

U.S. PATENT DOCUMENTS

| | | | |
|---|---|---|---|
| 5,742,642 A * | 4/1998 | Fertner | H04L 25/03057 |
| | | | 375/348 |
| 7,940,839 B2 | 5/2011 | Lapointe et al. | |
| 8,045,609 B2 | 10/2011 | Dai et al. | |
| 8,270,464 B2 | 9/2012 | Hidaka et al. | |
| 8,755,428 B2 | 6/2014 | Agrawal et al. | |
| 8,983,014 B2 | 3/2015 | Shibasaki | |
| 9,020,024 B1 | 4/2015 | Chaahoub et al. | |
| 9,077,574 B1 | 7/2015 | Healey et al. | |

(Continued)

OTHER PUBLICATIONS

Yoo, et. al., , "A 36Gb/s Adaptive Baud-Rate CDR with CTLE and 1-Tap DFE in 28nm CMOS, " IEEE International Solid-State Circuits Conference, pp. 126-128, 2019.

*Primary Examiner* — Eva Y Puente
(74) *Attorney, Agent, or Firm* — Muir Patent Law, PLLC

(57) ABSTRACT

Embodiments herein disclose a receiver for performing adaptive equalization of data samples, wherein the receiver comprises an adaptation circuitry and an equalizer coupled to the adaptive circuitry. The adaptive circuitry is configured to estimate a pulse response of a channel, on receiving at least one data sample over the channel, wherein the pulse response of the channel identifies an intersymbol interference (ISI) present on the received at least one data sample. The equalizer is configured to perform equalization of the received at least one data sample by cancelling the identified ISI on the received at least one data sample.

18 Claims, 17 Drawing Sheets

(56) References Cited

U.S. PATENT DOCUMENTS

| | | |
|---|---|---|
| 9,143,369 B2 | 9/2015 | He et al. |
| 9,215,112 B2 | 12/2015 | Leibowitz et al. |
| 9,276,781 B2 | 3/2016 | Xu et al. |
| 9,325,536 B2 | 4/2016 | Patel et al. |
| 9,705,708 B1 | 7/2017 | Jin et al. |
| 2010/0316111 A1* | 12/2010 | Berscheid ......... H04L 25/03038 375/232 |
| 2014/0064352 A1* | 3/2014 | Zhong ............... H04L 25/03076 375/232 |
| 2019/0296832 A1* | 9/2019 | Abughalieh ....... H04B 10/6162 |
| 2022/0302951 A1* | 9/2022 | Pandita ............... H04L 25/4917 |
| 2023/0037860 A1* | 2/2023 | Wang ................ H04L 25/03076 |

* cited by examiner

By moving across the CTLE codes, the ISI shrinks to a minimum and again rises after the optimum code.

Final convergence/maximally optimized code

| Slopes for the bounding transitions | Bit-Pattern | Values for the slopes | Abscissa (for crossing the threshold ($h_1$)) | |
|---|---|---|---|---|
| | | | Abscissa | Value |
| $m_1$ | 1\|110\|1 | $\dfrac{Z(h_0 - h_1)}{T}$ | $x_1$ | $\dfrac{T}{Z}\left(\dfrac{(h_0-h_1)+\Delta}{(h_0-h_1)}\right)$ |
| $m_2$ | | $\dfrac{Z(h_0 - h_1 - \Delta)}{T}$ | $x_2$ | $\dfrac{T}{Z}$ |
| $m_3$ | | $\dfrac{2(h_0 - h_1 + \Delta)}{T}$ | $x_3$ | $\dfrac{T}{Z}$ |
| $m_4$ | | $\dfrac{Z(h_0 - h_1)}{T}$ | $x_4$ | $\dfrac{T}{Z}\left(\dfrac{(h_0-h_1)-\Delta}{(h_0-h_1)}\right)$ |

METHODS AND SYSTEMS FOR PERFORMING ADAPTIVE EQUALIZATION OF DATA

CROSS-REFERENCE TO RELATED APPLICATIONS

This application claims priority from Indian Patent Application No. 202241015792, filed on Mar. 22, 2022, in the Indian Patent Office, the disclosure of which is incorporated by reference herein in its entirety.

BACKGROUND

The present disclosure relates to the field of receivers and more particularly to performing adaptive equalization of data in a receiver to compensate channel impairments. In high speed/performance Serializer/Deserializer (SerDes) communication systems, it may be difficult for a receiver to recover/resolve each of data samples received from a transmitter, as communication channels suffer from various effects that degrade the data samples transmitted from the transmitter. In an example, the various effects may include frequency dependent channel loss, reflections from impedance discontinuities, attenuations, or the like. Such effects cause neighboring data samples to interfere with one another, which may be referred as intersymbol interference (ISI). The ISI may be observed more at high signaling rates, which degrades signal quality such that distinctions between originally transmitted data samples may be lost. Thus, the receiver uses one or more equalizers to equalize the data samples by mitigating/canceling the ISI.

In conventional approaches, the receiver may use a Decision Feedback Equalizer (DFE), a front-end Continuous-Time Linear Equalizer (CTLE), a combination of the CTLE and the DFE, or the like, to equalize the data samples for mitigating the ISI. For high speed data path applications, such equalizers may be implemented as analog, transistor-level circuits while an adaptation is implemented via digital blocks, or the like. Further, the equalizers may be automatically adjusted using adaptive methods such as, but not limited to, a Least Mean Square (LMS) method, or the like. However, in high speed data path applications, an implementation of the LMS method may present various challenges. For example, it may be difficult to design reliable, cost effective circuitry for implementing the LMS method, as the LMS method involves a plurality of mathematical operations (for example, multiplication and addition of real numbers, or the like). Moreover, a circuit designed for implementing the LMS method may consume a relatively large amount of power and take up a lot of space on the receiver, and may be subject to unacceptable delays in a high speed data path.

In some conventional approaches, the receiver may implement the LMS method as a sign-sign LMS method (SSLMS), due to implementation challenges associated with the LMS method. The SSLMS method may be operated based on a sign of errors and a sign of data. However, the SSLMS method may have the following drawbacks:
  it takes time to converge equalization coefficients depending upon a step size and a magnitude of error, since the SSLMS method is not an accurate implementation of the LMS method;
  the equalization coefficients may converge at a wrong position, if noise in the communication channel is correlated;
  if the error is large, the error may not be digitized as 0 or 1, since the error may wander around an absolute minimum instead of reaching the absolute minimum using a gradient;
  CDR locking and DFE convergence loops may interact too often to challenge the convergence in variable channel environments; and
  the ISI may be mitigated without estimating the ISI present on the received data samples.

In some conventional approaches, the receiver may use an eye diagram to estimate and mitigate the ISI. However, the receiver may require a complex eye scan to plot the eye diagram for estimating the ISI.

In some conventional approaches, the receiver may equalize the data samples using an EOM method to mitigate the ISI. The EOM method involves detecting cross-over/intersection of two different patterns corresponding to the data sample and measuring a height of the cross-over using a digital engine similar to the eye-scan for the given ISI. However, such a method typically requires a complex mixed mode circuit to calculate and measure the height of the cross-over for the given ISI.

SUMMARY

Aspects of the embodiments herein include methods and systems for performing adaptive equalization of data in a receiver.

Additional aspects of the embodiments herein include methods and systems for estimating a pulse response of a channel from received data samples, wherein the pulse response of the channel identifies intersymbol inference (ISI) present on the received data samples.

Further aspects of the embodiments herein include methods and systems for performing equalization of the received data samples by cancelling the identified ISI.

Accordingly, the embodiments herein provide a receiver comprising an adaptation circuit and an equalizer coupled to the adaptation circuit. The adaptation circuit is configured to estimate a pulse response of a channel, on receiving at least one data sample over the channel, wherein the pulse response of the channel identifies intersymbol interference (ISI) present on the received at least one data sample. The equalizer is configured to perform equalization of the received at least one data sample by cancelling the identified ISI.

Accordingly, the embodiments herein provide an adaptation circuit to estimate a pulse response of the channel, wherein the adaptation circuit comprises an adaptation controller, a reference regulator, an adaptation sampler, a pattern filter, a filter, and a Phase Rotator (PR). The adaptation controller is configured to set a default threshold value of '0' for the adaptation sampler that converges the PR to a position of an edge sampling clock of a Clock and Data recovery (CDR) circuitry. The adaptation controller is configured to perform a plurality of pulse response estimation iterations, until estimating the plurality of cursors present in the pulse response of the channel. At each stage of pulse response estimation iteration, the pattern filter is configured to select a pattern for each of the received at least one data sample from a stored plurality of patterns, the reference regulator is configured to vary threshold values of the adaptation sampler with respect to the selected pattern based on a previous converging position of the PR, the filter is configured to process an output of the adaptation sampler corresponding to the varied threshold values and provide the processed output of the adaptation sampler with respect to the varied threshold values to the PR in a negative feedback loop, the PR is configured to converge to a same position corresponding to the previous converging position for one of the varied threshold values of the adaptation sampler with respect to the selected pattern, and the adaptation controller is configured to estimate one of the varied threshold values of the adaptation sampler that caused the PR to converge at the same position corresponding to the previous converging position as a value of a cursor of the plurality of cursors, with respect to a length and a type of the selected pattern.

Accordingly, the embodiments herein provide a method for performing adaptive equalization of data in a receiver. The method includes estimating, by an adaptation circuit, a pulse response of a channel, on receiving at least one data sample over the channel, wherein the pulse response identifies intersymbol interference (ISI) present on the received at least one data sample. The method includes performing, by an equalizer, equalization of the received at least one data sample by cancelling the identified ISI.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF DRAWINGS

Embodiments herein are illustrated in the accompanying drawings, throughout which like reference labels indicate corresponding parts in the various figures. The embodiments herein will be better understood from the following description with reference to the drawings, in which.

DETAILED DESCRIPTION

Figure 1:
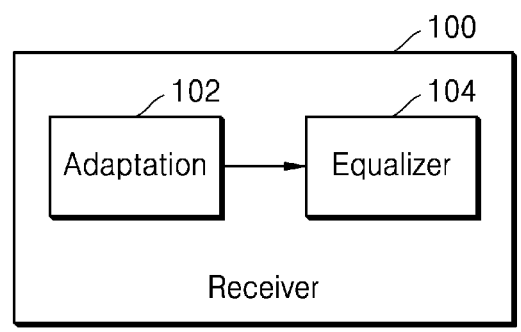
FIG. 1 depicts a receiver, according to embodiments as disclosed herein.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for performing adaptive equalization of data to equalize/compensate channel impairments like intersymbol interference (ISI).

Embodiments herein disclose methods and systems for estimating a plurality of cursors present in a pulse response of a channel from data samples received at a receiver. The plurality of cursors provide information about the ISI on the received data samples.

Embodiments herein disclose methods and systems for equalizing the data samples at high signaling rates by optimally shaping the pulse response of the channel to ensure high Bit Error Rate (BER) in different signaling environments.

Referring now to the drawings, and more particularly to FIGS. 1 through 9, where similar reference characters denote corresponding features consistently throughout the figures, there are shown example embodiments.

FIG. 1 depicts a receiver 100, according to embodiments as disclosed herein. The receiver 100 referred herein may be used in at least one of, but is not limited to, a high speed Serializer/Deserializer (SerDes) communication system, a data center router, a wireline communication system, or any other system supporting high speed data path applications.

In an example, the receiver 100 may be at least one of, but is not limited to, SerDes receiver, a serial receiver, a single-data-rate (SDR) receiver, a double-date-rate (DDR) receiver, a quad-date-rate (QDR) receiver, or any other similar receiver that supports the high speed data path applications.

In an example, the receiver 100 may be implemented using Complementary metal-oxide-semiconductor (CMOS) technology. In another example, the receiver 100 may be implemented using one of other types of processes such as, but not limited to, Bipolar CMOS, Bipolar junction transistors, and so on.

In an example, the receiver 100 may be operated at high data rates in order to support the high speed data path applications. In an example, the receiver 100 may operate above 10 Giga bits per second (Gb/s) data rates.

It should be understood that embodiments described herein may be applicable to other applications including other types of receivers, architecture, data rates, and so on.

The receiver 100 may be configured to receive data samples from a transmitter over a channel/communication channel (not shown).

The channel may be formed from any suitable physical transmission medium. The channel may include one or more transmission paths for communicating the data samples between the transmitter and the receiver. Examples of the transmission paths may be, but are not limited to, fiber optic cable paths, conductive wires, differential signaling paths made of conductive wires, coaxial cable paths, wireless interfaces, traces on printed circuit boards, backplane connectors, or any other suitable communication link paths. It is understood that the transmission paths may include a combination of above described paths or may include two or more of various paths (including those described above) at the same time.

In an example, the data samples may correspond to data symbols or data bits or information bits. In another example, the data samples may correspond to a data signal or data signals indicating the information bits. The data signal may be a voltage signal or a current signal. Embodiments herein use the terms such as "data", "data samples", "data symbols", "data bits", "data signal", "data points", and so on, interchangeably to refer to information/data received from the transmitter over the channel.

The data samples received at the receiver 100 may be degraded, since the channel suffers from various effects such as, but not limited to, dispersion, reflection, attenuation, or the like. Thus, the receiver 100 may perform an adaptive equalization on the received data samples to recover the data samples. The receiver 100 may perform the equalization of the data samples by equalizing/compensating/canceling channel impairments on the received data samples. The channel impairments may be caused due to the effects from which the channel has suffered. In an example, the channel impairments correspond to intersymbol interference (ISI). The ISI is a form of distortion of the data samples in which one data sample interferes with subsequent data samples.

In an example, the receiver 100 may perform the equalization of the data samples by canceling the channel impairments for variable channel environments. The variable channel environments may indicate that the channel may suffer from the effects such as, but not limited to, dispersion, reflection, attenuation, or the like, in terms of maxima and minima.

In an embodiment, for performing the equalization, the receiver 100 estimates a pulse response of the channel from the received one or more data samples. The pulse response identifies the ISI present on the received data samples. The receiver 100 performs the equalization of the data samples by cancelling/compensating the ISI present on the received data samples. Thus, the receiver 100 cancels the ISI by estimating the ISI present on the received data samples, which enhances Bit Error Rate (BER) and Jitter tolerance (JTOL) metrics at very high signaling/data rates.

The receiver 100 includes an adaptation circuitry 102, and an equalizer 104 for performing the adaptive equalization of the data samples. The receiver 100 may also include a transceiver, a storage/memory, a communication interface, an Input/Output (I/O) port, and so on (not shown) to perform other intended functions.

The adaptation circuitry 102 may be configured to estimate the pulse response of the channel from the received data samples over the channel. In an embodiment, estimating the pulse response of the channel involves estimating a sign and a magnitude of each of a plurality of cursors present in the pulse response of the channel. The plurality of cursors includes a main cursor, one or more pre-cursors, and one or more post cursors. The plurality of cursors present in the pulse response of the channel identifies the ISI present on the received data samples. The adaptation circuitry 102 for estimating the plurality of cursors present in the pulse response of the channel is described in detail in conjunction with FIG. 2, and may be alternatively described as an estimation circuit or analysis circuit.. Embodiments herein use the terms "pulse response", "cursors", "pulse coefficients", "ISI information", and so on, interchangeably to refer to a channel response identifying the ISI.

The equalizer 104 may be configured to perform the equalization of the data samples by canceling the ISI present on the received data samples. In an embodiment, the receiver 100 may use the equalizer 104 or a combination of equalizers to perform the equalization of the data samples. In an example, the equalizer 104 may be a Decision Feedback Equalizer (DFE). In another example, the equalizer 104 may be a front-end Continuous-Time Linear Equalizer (CTLE). In another example, the equalizer 104 may be a combination of the DFE and the CTLE. In an embodiment, the equalizer 104 may be implemented as analog circuits, transistor-level circuits, and so on.

In an embodiment, the equalizer 104 may perform the equalization of the data samples by canceling the ISI using equalization codes or using a combination of the equalization codes. Examples of the equalization codes may be, but are not limited to, DFE codes, CTLE codes, and so on. In another embodiment, the equalizer 104 may perform the equalization of the data samples using an analog equalization method. A function of the equalizer 104 may be inferred by one of ordinary skill in the art based on its name or type, and thus, its detailed description is omitted.

FIG. 1 shows exemplary blocks of the receiver 100, but it is to be understood that other embodiments are not limited thereon. In other embodiments, the receiver 100 may include a smaller or larger number of blocks. Further, the labels or names of the blocks are used only for illustrative purpose and do not limit the scope of the embodiments herein. One or more blocks can be combined together to perform the same or substantially similar function in the receiver 100.

Figure 2:
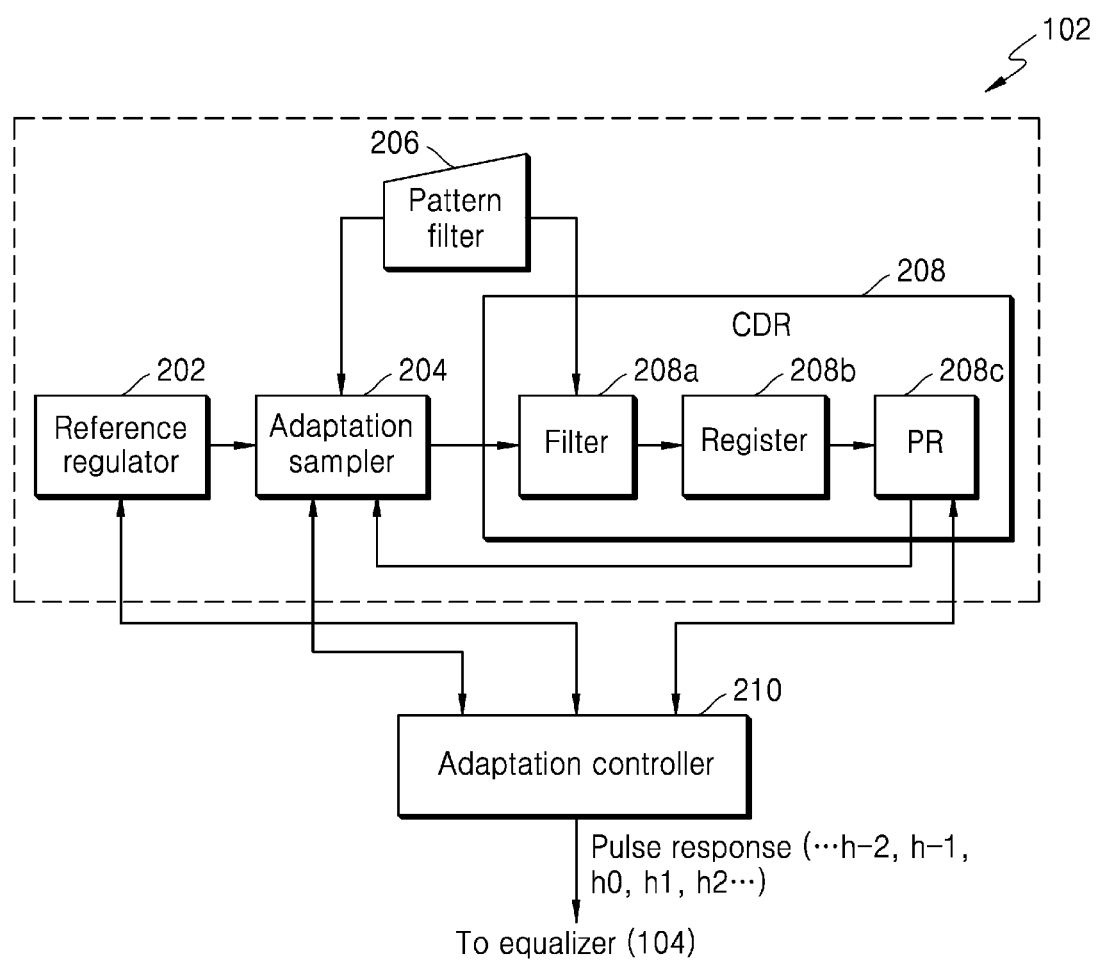
FIG. 2 is an example block diagram depicting components of an adaptation circuitry for estimating a pulse response of a channel, according to embodiments as disclosed herein.

FIG. 2 is an example block diagram depicting components of the adaptation circuitry 102 for estimating the pulse response of the channel, according to embodiments as disclosed herein. The adaptation circuitry 102 includes a reference regulator 202, an adaptation sampler 204, a pattern filter/selector 206, a Clock and Data Recovery (CDR) circuit 208, and an adaptation controller 210.

The reference regulator 202, also described as a reference regulator circuit and which may be implemented as a circuit, may be a part of a power supply unit (not shown) of the receiver 100. The reference regulator 202 may be configured to regulate a voltage for the adaptation sampler 204 and the CDR circuit 208. In an example, the reference regulator 202 may be an analog regulator circuit, which regulates Alternate Current (AC) voltages. In another example, the reference regulator 202 may be a digital regulator circuit, which regulates DC voltages.

The adaptation sampler 204, also described as an adaptation sampler circuit and which may be implemented as a circuit, may be configured to sample the received data samples using the CDR circuit 208. Embodiments herein use the terms "adaptation sampler", "error sampler", and so on, interchangeably through the document.

The pattern filter 206, also described as a pattern filter circuit and which may be implemented as a circuit, may be configured to store a plurality of patterns and select a pattern from the stored plurality of patterns for the received data samples. In an example the patterns may be of 3 bits, 4 bits, or the like.

The CDR circuit 208 may be configured to recover the received data samples from the transmitter. In an example herein, the CDR circuitry 208 may include at least one of, a bang-bang approach based CDR, a baud rate based CDR, and so on. The CDR 208 includes a filter 208a, a register/accumulator 208b, and a Phase Rotator (PR) 208c. The filter 208a may be configured to process an output of the adaptation sampler 204 and provide the processed output of the adaptation sampler 204 to the PR 208c in a negative feedback loop. In an example, the filter 208a may be a digital loop filter. In another example, the filter 208a may be an analog filter. The register 208b may store a CDR and adaptation logic, which may be used to operate the PR 208c. The PR 208c may be configured to receive an input clock (for example, an adaptation clock (CK_ADAPT)) and adjust a phase of the input clock based on the CDR and adaptation logic. The adjusted phase of the input clock may be referred hereinafter as a derived clock (der_clk) from the PR 208c. In an embodiment, the PR 208c may be a Phase Interpolator (PI). Embodiments herein use the terms "PR", "PI", and so on, interchangeably through the document.

Functions and operation of the reference regulator 202, the adaptation sampler 204, the pattern filter 206, the CDR circuitry 208, and components of the CDR circuitry 208 may be inferred by one of ordinary skill in the art based on their name or type, and thus, their detailed description is omitted.

The adaptation controller 210 may be configured to estimate the pulse response of the channel ( ... $h_{-2}$, $h_{-1}$, $h_0$, $h_1$, $h_2$ ... ) using the reference regulator 202, the adaptation sampler 204, the pattern filter 206, and the CDR circuitry 208. The pulse response of the channel includes the main cursor ($h_0$), the one or more pre-cursors ($h_{-1}$, $h_{-2}$ ... ), and the one or more post-cursors ($h_1$, $h_2$ ... ). According to some exemplary embodiments, the adaptation controller 210 may be a processor. The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multi-processor, an application-specific integrated circuit (ASIC), a field programmable gate array (FPGA), and so on. According to at least some alternative exemplary embodiments, the adaptation controller 210 may be implemented as a circuit, as one or more programs (e.g., software/firmware) or a combination of circuitry and software.

For estimating the pulse response of the channel, the adaptation controller 210 sets a default threshold value of '0' for the adaptation sampler 204. The adaptation controller 210 enables the reference regulator 202 to provide the default threshold value (in terms of voltage) to the adaptation sampler 204, which converges the PR 208c to a position of an edge sampling clock of the CDR circuit 208. On setting the default threshold value for the adaptation sampler 204, the adaptation controller 210 initiates the estimation of the pulse response of the channel in a plurality of iterations. The plurality of iterations may be performed until estimating and canceling all the pre-cursors and post-cursors present in the pulse response of the channel. Thereby canceling the ISI present on the received data samples.

At each stage of iteration, the pattern filter/selector 206 selects a pattern for the received data samples from the stored plurality of patterns. At each stage of iteration, the pattern filter 206 may select different patterns. In an embodiment, the pattern selected at each stage of iteration may be the same length as a previously selected pattern. In another embodiment, the pattern selected at each stage of iteration may be a pattern with a progressively increased pattern length from the stored plurality of patterns at each stage of iteration. The pattern with the progressively increased pattern length includes progressively increased numbers of bits. For example, at a first stage of iteration, the pattern filter 206 may select an example pattern 1|1110|1 of 3 bits, wherein a bit '1' before 110 represents a previous bit and a bit '1' after 110 represents a future bit. Similarly, at second, third, and fourth stages of iteration, the pattern filter 206 may select patterns 1|1110|0, 1|011|1, and 1|010|0, respectively. On selecting all the patterns of 3 bits length, the pattern filer 206 may select the pattern of 4 bits length at a successive stage of iteration.

On selecting the pattern, the reference regulator 202 initiates varying the threshold values of the adaptation sampler 204 with respect to the selected pattern based on a previous converging position of the PR 208c. The threshold value of the adaptation sampler corresponds to a function of the plurality of cursors present in the pulse response. Arguments of the function grow in proportion to the number of bits of the selected pattern due to estimating and cancelling the plurality of cursors in the pulse response from neighboring bits of the previously selected pattern.

The pattern filter 208a processes the output of the adaptation sampler 204 corresponding to each of the varied threshold values. The pattern filter 210 provides the processed output of the adaptation sampler 204 corresponding to each of the varied threshold values to the PR 208c in the negative feedback loop.

The PR 208c may converge at the same position corresponding to the previous converging position for one of the varied threshold values of the adaptation sampler 204 with respect to the selected pattern. Converging of the PR 208c refers to locking of the derived clock of the PR 208c at the position corresponding to the previous converging position. The adaptation controller 210 identifies the convergence of the PR 208c with respect to one of the varied threshold values of the adaptation sampler 204 for the selected pattern based on output voltage levels of the reference regulator 202. The adaptation controller 210 identifies the convergence of the PR 208c by swerving (e.g., incrementally toggling) through the output voltage levels of the reference regulator 202 at a sampling position and performing one or more actions on the output voltage levels of the reference regulator 202 in-effect reaching to a threshold value of the reference regulator 202 corresponding to the selected pattern. In an example, the one or more actions may include at least one of, summation of the output voltage levels of the reference regulator 202, subtraction of the output voltage levels of the reference regulator 202, and so on. At each stage of iteration, varying the different threshold values of the adaptation sampler 204 for the selected pattern causes the PR 208c to always converge at a unique threshold value independent of the patterns.

On identifying the convergence of the PR 208c, the adaptation controller 210 estimates the threshold value of the adaptation sampler 204 at which the PR 208c converges to the previous converging position as a value of a cursor of the plurality of cursors, with respect to a length and a type of the selected pattern. Thus, at each stage of iteration, one of the plurality of cursors may be estimated. In an embodiment, estimating the value of a cursor includes estimating the sign and the magnitude of the cursor.

In an embodiment, the adaptation controller 210 may estimate the threshold value of the adaptation sampler 204 at which the PR 208c converges to the previous converging position as the value of the cursor by using alternate cycles of reference calibration and PR calibration. The adaptation controller 210 may estimate the value of the cursor using the alternate cycles of the reference calibration and the PR calibration to detect non-monotonicity, which may aid in equalizing the data samples optimally.

In an example, the reference calibration includes an analog calibration, if the reference regulator 202 used in the adaptation circuitry 102 is the analog regulator. In another example, the reference calibration includes a digital calibration method, if the reference regulator 202 used in the adaptation circuitry 102 is the digital regulator. In accordance with the digital calibration method and the PR calibration, the adaptation controller 210 estimates the value of the cursor by alternating counting through the output voltage levels of the reference regulator 202 with an increment or decrement counting on the equalization codes (the CTLE code, the DFE code, or the like). Estimating the value of cursor in accordance with the digital calibration method and the PR calibration is described in detail in conjunction with FIGS. 3, 4a, and 4b.

At each stage of iteration, the adaptation controller 210 may estimate the progressively increasing number of cursors in the pulse response corresponding to the progressively increased pattern length with an increased resolution.

The adaptation controller 210 provides the estimated pulse response of the channel to the equalizer 104, which performs the equalization of the data samples by optimally shaping the estimated pulse response of the channel. Thus, canceling the ISI on the received data samples.

FIG. 2 shows exemplary blocks of the adaptation circuitry 102, but it is to be understood that other embodiments are not limited thereto. In other embodiments, the adaptation circuitry 102 may include less or more number of blocks. Further, the labels or names of the blocks are used only for illustrative purpose and do not limit the scope of the embodiments herein. One or more blocks can be combined together to perform the same or substantially similar functions in the adaptation circuitry 102.

Embodiments herein further explain the adaptive equalization of the data samples by considering digital components of the receiver 100 as an example, but in some embodiments, analog components of the receiver 100 may also be considered.

Figure 3:
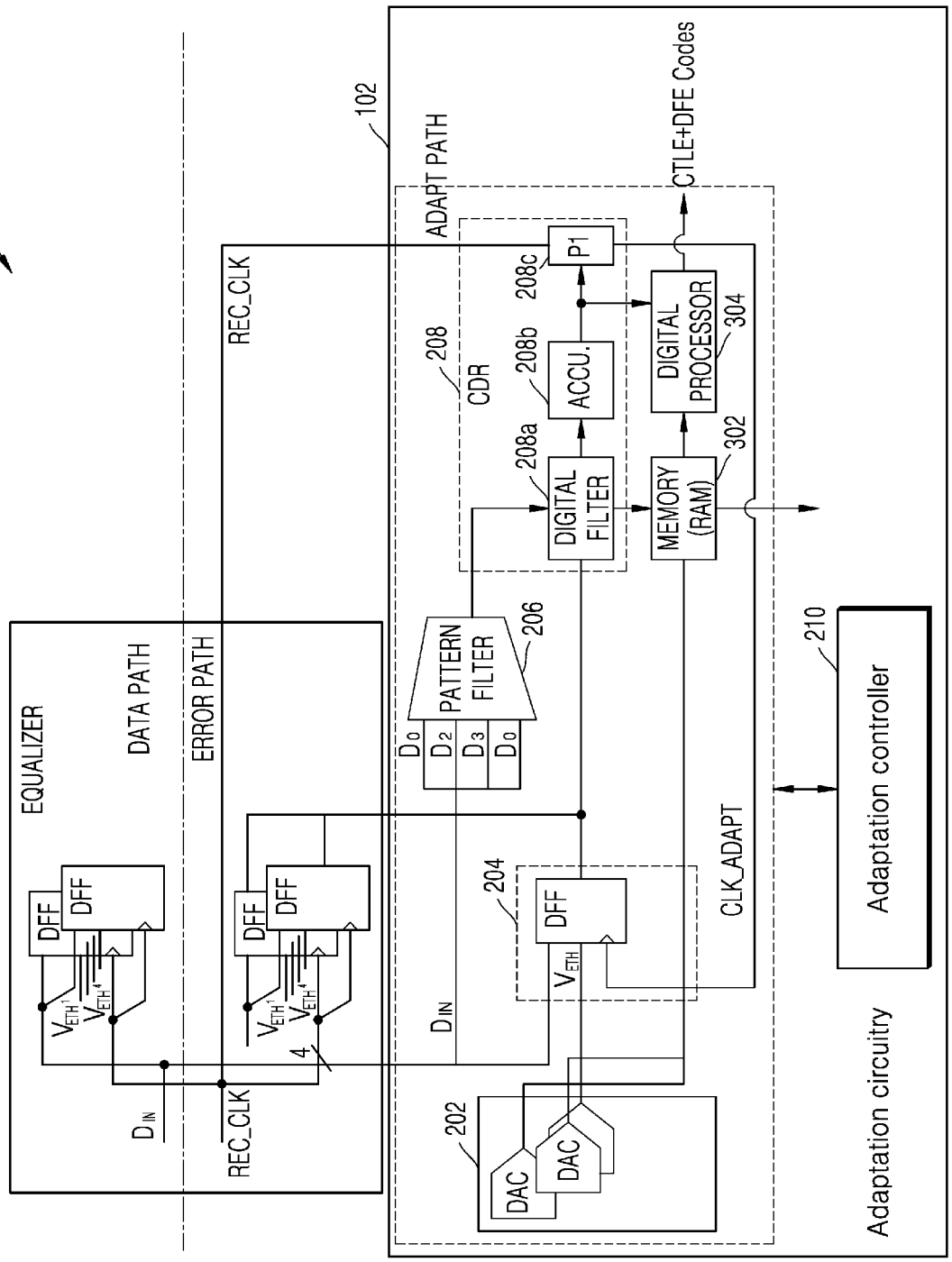
FIG. 3 is an example architecture of the receiver for performing the adaptive equalization of the data samples, wherein the receiver includes digital components, according to embodiments as disclosed herein.

FIG. 3 is an example architecture of the receiver 100 for performing the adaptive equalization of the data samples, wherein the receiver 100 includes digital components, according to embodiments as disclosed herein. The receiver 100 includes the adaptation circuitry 102, and the equalizer 104. The adaptation circuitry 102 includes a digital regulator 202 as the reference regulator 202, the adaptation sampler 204, the pattern filter 206, the CDR circuit 208, the adaptation controller 210, a memory 302, and a digital processor 304. The adaptation controller 210 controls operations of the DAC 202, the adaptation sampler 204, the pattern filter 206, and the CDR circuit 208.

In an example herein, the digital regulator 202 may be a Digital to Analog Converter (DAC). The adaptation sampler/error sampler 204 includes a Delay Flip Flop (DFF). The CDR 208 includes a digital filter 208a as the filter 208a, the accumulator/register 208b with the CDR and adaptation logic, and the PR/PI 208c.

The DAC 202 sets the default threshold of the adaptation sampler 204 as '0', which converges the PR 208c to the position of the edge sampling clock of the CDR circuit 208. On setting the default threshold value for the adaptation sampler 204, at step 1, the pattern filter 206 selects the pattern from the plurality of stored patterns for the received data samples;

at step 2, the DAC 202 initiates varying the threshold values of the adaptation sampler 204 in increments with respect to the selected pattern;

at step 3, the digital filter 208a processes the output of the adaptation sampler 204 corresponding to each of the varied threshold values of the adaptation sampler 204 for the selected pattern and provides the processed output of the adaptation sampler 204 with respect to the selected pattern to the PR/PI 208c;

at step 4: the PR/PI 208c converges to the position corresponding to the previous converging position for one of the varied threshold values of the adaptation sampler 204. At each stage of iteration, the PR 208c wanders from the previous converging position and returns to the same position for one of the varied threshold values of the adaptation sampler 204 with respect to the selected pattern, which guides a direction of a threshold voltage of the DAC (hereinafter referred as a DAC threshold). The adaptation controller 210 searches the convergence position of the PR 208c for the selected pattern by running through the output voltage levels/DAC codes of the DAC in-effect reaching to the DAC threshold corresponding to the selected pattern;

at step 5; the adaptation controller 210 estimates the threshold value of the adaptation sampler 102 with respect to the selected pattern that causes the PR 208c to converge to the previous converging position as the value of one of the plurality of cursors of the pulse response. The adaptation controller 210 estimates the value of the cursor by performing the digital calibration method and the PR calibration. In accordance with the digital calibration method and the PR calibration, when the PR 208c converges at the previous converging position for one of the threshold values of the adaptation sampler 204 with respect to the selected pattern, the adaptation controller 210 enables the DAC 202 to start incrementing a DAC code (i.e., the output voltage levels of the reference regulator 202) from the current voltage level, until reaching a maximum (max) ISI edge. The DAC 202 may be signaled by adaptation controller 210 when the DAC code reaches the maximum ISI edge. At the point when the DAC code reaches the max ISI edge, the adaptation controller 210 initiates a decrementing cycle of one of the equalization codes (for example herein, consider a CTLE code). The adaptation controller 210 decrements the CTLE code from a maximum value (for example, a $15^{th}$ bit code) to a certain value, where a vertical band for the ISI at the converging position of the PR 208c is minimized. As the CTLE code is decremented, the vertical band for the ISI at the converging position of the PR 208c may reach a minimum before starting to move in the other direction. Once, the vertical band for the ISI is minimized, the CTLE code may be latched to the optimized code. Once the CTLE code is latched, the adaptation controller 210 swerves through the DAC codes with respect to the decrementing cycle of the CTLE code to estimate the value of the cursor of the pulse response.

The steps 1-5 may be performed recursively or in the plurality of iterations, until estimating all the cursors of the pulse response of the channel. The adaptation controller 210 provides the estimated pulse response of the channel to the equalizer 104.

The memory 302 stores the estimated pulse response of the channel. The digital processor 304 may be configured to update the equalization codes (for example herein, the combination of the CTLE code and the DFE code) based on the estimated pulse response of the channel and an output of the PR 208c. The digital processor 304 provides the updated combination of the CTLE code and the DFE code to the equalizer 104.

The equalizer 104 may include one or more DFFs to perform the equalization of the data samples by canceling the identified ISI/pulse response using the updated combination of the CTLE code and the DFE code.

Thus, in an embodiment herein, the pulse/impulse response of the channel may be estimated before and after equalization to a reasonable accuracy to determine the extent of the equalization done/required and thereby to correct the ISI present on the received data samples.

FIGS. 4a, 4b, 4c, and 4d are example diagrams depicting estimation of the pulse response of the channel using the digital calibration method and the PR calibration, according to embodiments as disclosed herein. The adaptation circuitry 102 comprising the DAC 202, the adaptation sampler 204, the pattern filter 206, the CDR circuit 208, and the adaptation controller 210 may be configured to estimate the pulse response of the channel in a plurality of iterations. In each stage of iteration, the pattern filter 206 selects the pattern from the pre-stored patterns for the received data samples in order to derive the ISI information. The ISI information may be a direct manifestation of the pulse response of the channel to the receiver. Once the pattern is detected, the DAC 202 initiates varying the threshold values of the adaptation sampler 204 and the PR 208c converges/locks to the previous converging position based on one of the threshold values of the adaptation sampler 204 varied with respect to the selected pattern. When the PR 208c converges, the adaptation controller 210 estimates the cursor of the pulse response/vertical band for the ISI by counting/swerving through the DAC codes. Also, when the PR 208c converges, the adaptation controller 210 starts decrementing the CTLE code from the maximum code to reduce the vertical band for the ISI at the converged/locked position of the PR 208c. The vertical band for the ISI may be tracked by the DAC 202 to ensure a minimum value of the vertical band for the ISI.

The above described process of selecting the new pattern, locking the PR 208c to the converging position by varying the threshold value of the adaptation sampler 204, and performing the decrementing cycle of the CTLE code may be continued to estimate and cancel all the pre-cursors and post cursors present in the pulse response.

Figure 4A:
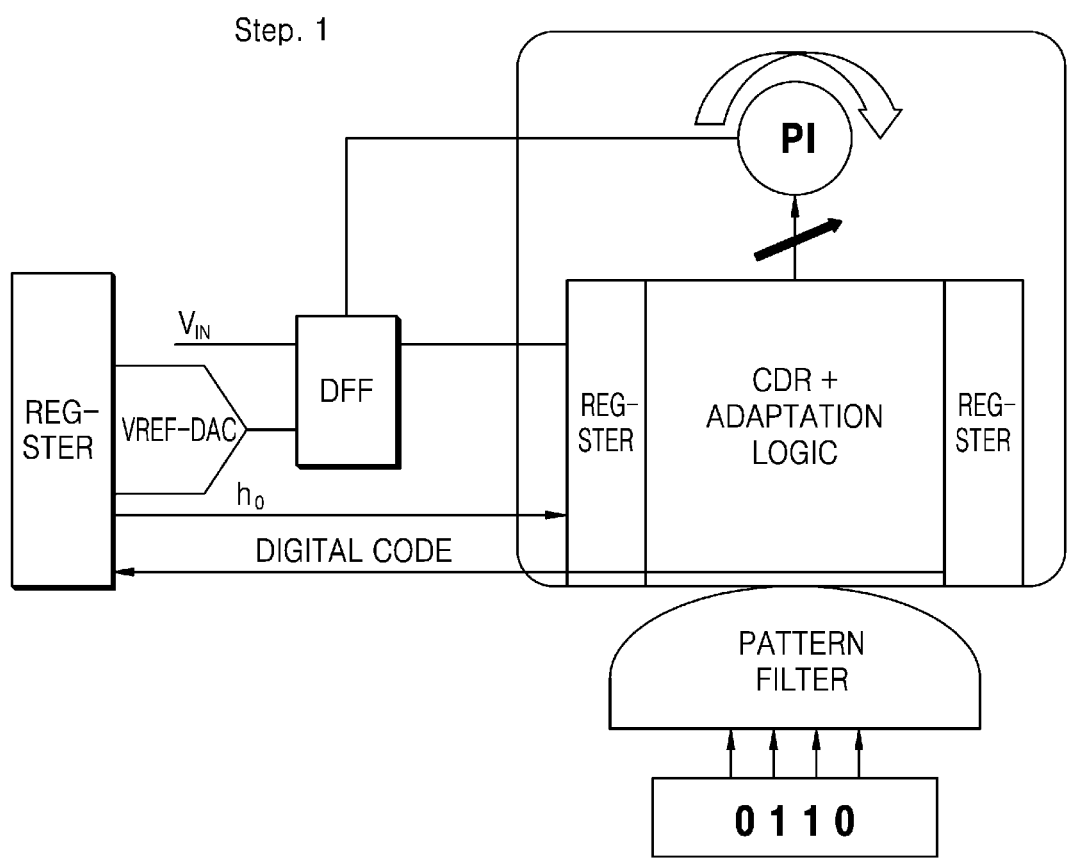
FIGS. 4a, 4b, 4c, and 4d are example diagrams depicting estimation of the pulse response of the channel using a digital calibration method and a Phase Rotator (PR) calibration, according to embodiments as disclosed herein.

Consider an example scenario, as depicted in FIG. 4a, at step 1, the adaptation controller 210 sets the threshold value of the adaptation sampler/error sampler 204 with an output of the DAC 202 for an example pattern of 0110. In an example herein, the output of the DAC 202 may be fixed to a voltage Vref of the received/incoming data samples at the start of equalization. The setting of the threshold value of the adaptation sampler causes the derived clock (der_clk) from the PR 208c to lock at a converging position T/2. The converging position T/2 may be an average of all crossovers of the patterns.

Figure 4B:
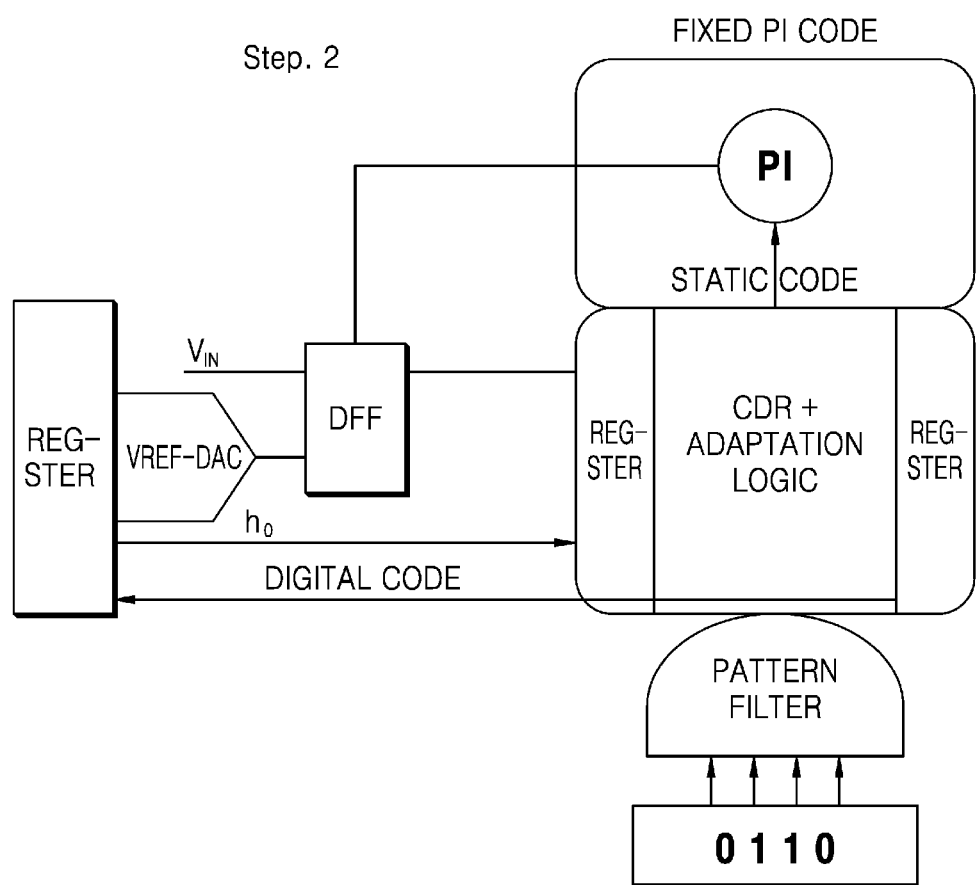

At step 2, as depicted in FIG. 4b, once the der_clk locks at the converging position T/2, a PI code of the PR 208c may be frozen. Once the der_clck locks at the converging position T/2 for the value of Vref, the DAC 202 increments the DAC code (i.e., the output voltage levels of the reference regulator 202) from the value of the Vref and increasing to reach the max ISI edge, which has been signaled by the adaptation controller 210. At the point, where the DAC code reaches to the max ISI edge, all the data samples/bits may be detected as "0". On detecting the data samples/bits as "0", the adaptation controller 210 initiates a decrement cycle of the CTLE code. The adaptation controller 210 decrements the CTLE code from maximum to the certain value, so that the vertical band for the ISI at the converging position is minimized. The PR 208c/adaptation loop may operate at each CTLE code. As the CTLE code is decremented, the vertical band for the ISI at the converging position T/2 may reach a minimum before starting to move in the other direction. Once, the vertical band is minimized, the CTLE code may be latched to the optimized code. Based on the latching of the CTLE code to the optimized code, the adaptation controller 210 estimates the value of the main cursor ($h_0$) by swerving through the DAC codes.

Figure 4C:
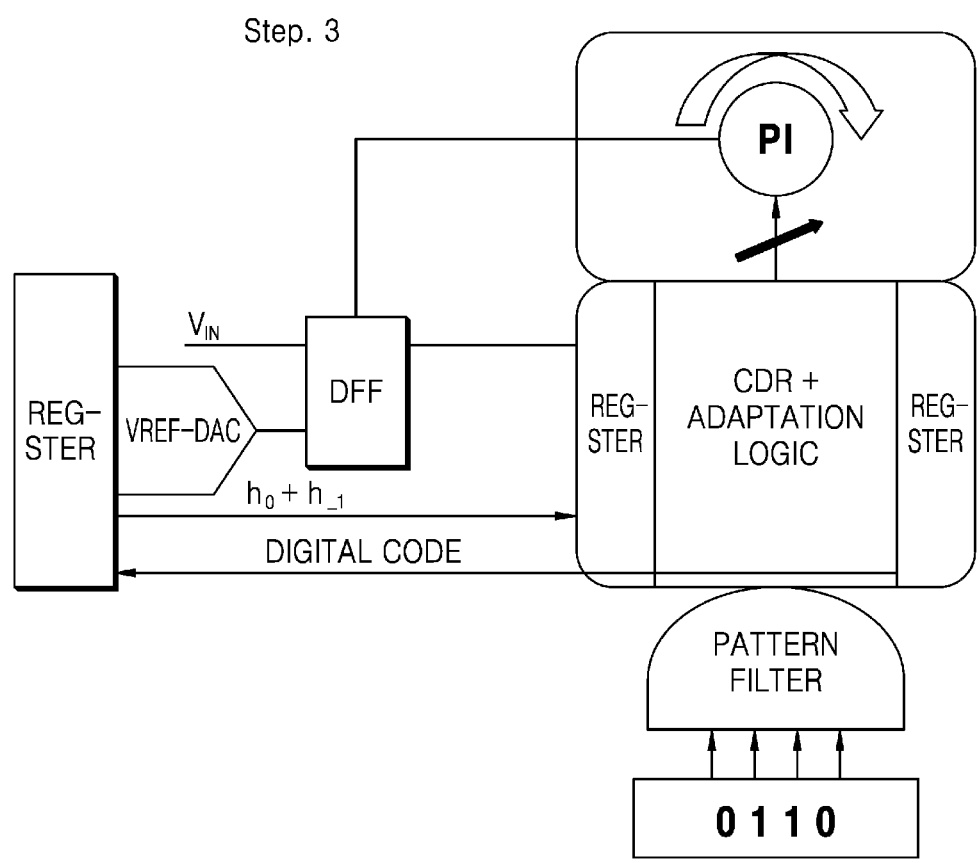
Figure 4D:
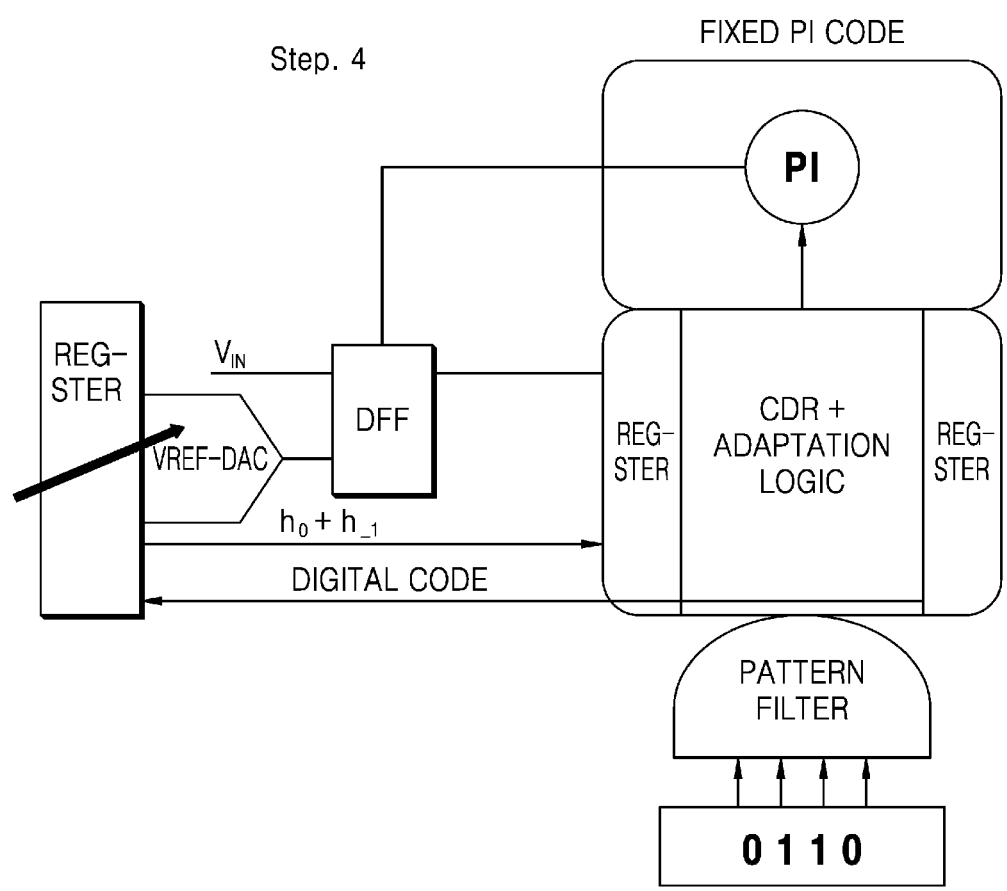

At step 3, as depicted in FIG. 4c, the pattern filter 206 selects the next pattern 0111 for the incoming data samples. On selecting the pattern 0111, the DAC 202 initiates varying the threshold values of the adaptation sampler 204 by incrementing the DAC code over the Vref. The derived clock (der_clk) of the PR 208c locks at the previous converging position that is at T/2 for one of the varied threshold values of the adaptation sampler 204 corresponding to the selected pattern 0111.

At step 4, once the der_clk of the PR 208c converges to the previous converging position, the adaptation controller 210 initiates performing the decrementing cycle of the CTLE code, as depicted in the step 2 to ensure that the CTLE code may be the optimized code stored in the register 208b. The adaptation controller 210 then estimates the value of a first pre-cursor ($h_{-1}$) by swerving through the DAC codes.

The above steps may be repeated until estimating and cancelling of the remaining cursors present in the pulse response of the channel.

Figure 5:
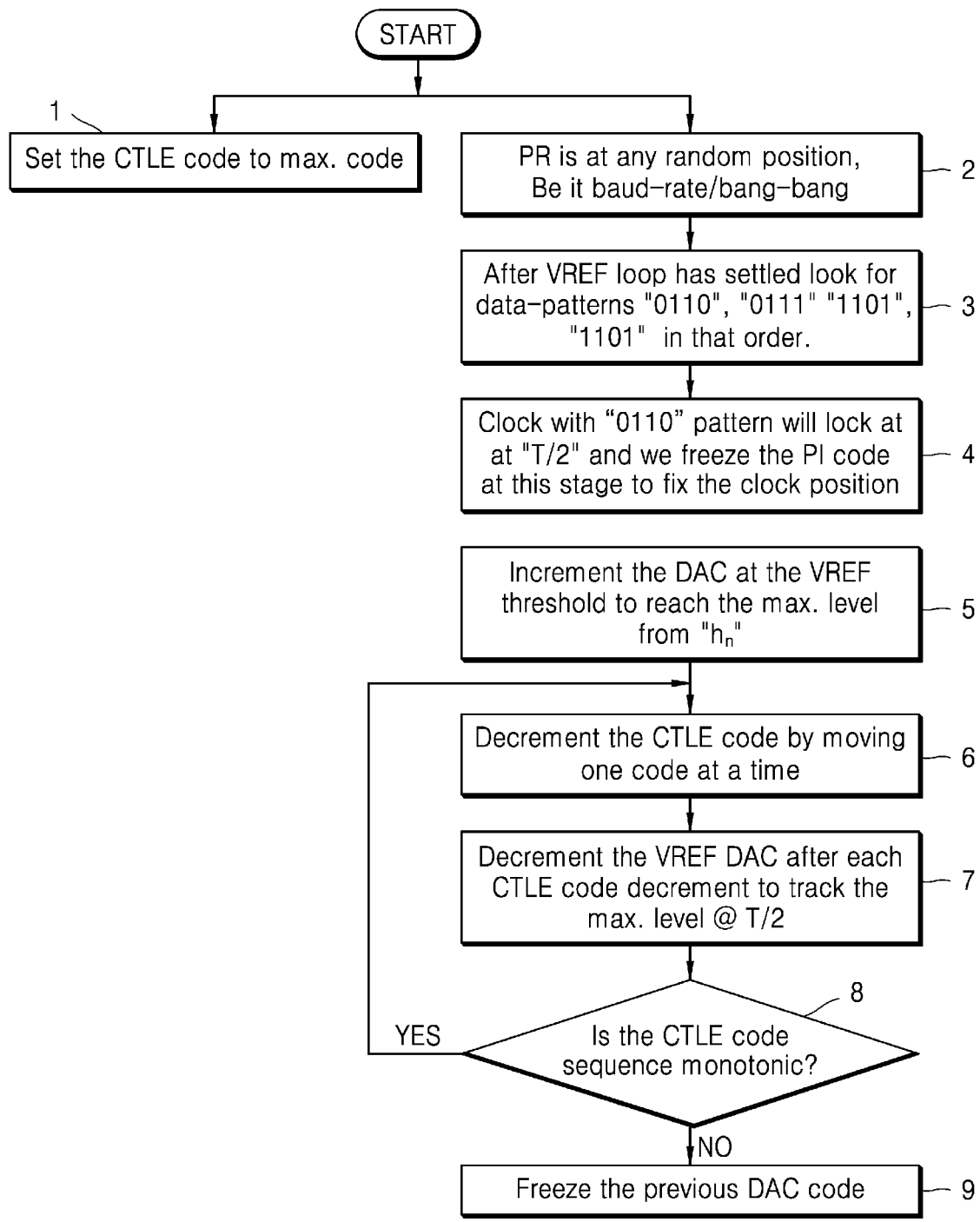
FIG. 5 is an example flow diagram depicting estimation of a value of a cursor by performing the digital calibration method and the PR calibration, according to embodiments as disclosed herein.

FIG. 5 is an example flow diagram depicting estimation of the value of the cursor by performing the digital calibration method and the PR calibration, according to embodiments as disclosed herein.

At step 1, the adaptation controller 210 sets the CTLE code to the maximum code (for example, the maximum code may be $15^{th}$ code), which helps in detecting the different patterns with maximum equalization settings. A position where the CTLE code is set to the maximum code is a position where the DAC 202 sets the threshold value of the adaptation sampler/error sampler 204 as Vref to output equal number of 0's and 1's.

At step 2, the PR 208c of the CDR circuit 208 may be at any random position. At step 3, after the Vref of the DAC 202 has been settled, the pattern filter 206 selects the data patterns "0110", "0111", "1101", and "1101" in order.

At step 4, the derived clock (der_clk) from the PR 208c locks at the previous converging position corresponding to the input clock with the pattern "0110", by accumulating equal number of 0's and 1's in the accumulator/register 208b. The previous converging position may be a T/2 position, which is the average position of the crossovers of all the patterns.

At step 5, the DAC 202 starts incrementing the values of the Vref starting from the value of "$h_0$" for the adaptation sampler 204. One of the values of the Vref causes the derived clock (der_clk) from the PR 208c to lock at the previous converging position (i.e., the position T/2) by accumulating equal number of 0's and 1's in the accumulator/register 208b.

Once the derived clock from the PR 208c converges, at step 6, the adaptation controller 210 starts decrementing the CTLE codes sequentially from the maximum code/15$^{th}$ code to a lower value. At a point where the CTLE reaches the lower value, the vertical band of the ISI may be "Δ" around the lower value. Every decrease/decrement of the CTLE code accumulates binary data over a fixed number of cycles to calculate an average number of 1's and 0's through a digital decoding and filter (not shown).

At step 7, the adaptation controller 210 enables the DAC 202 to decrement the Vref after each decrement of the CTLE code to track a maximum voltage level around "h$_0$" (i.e., at the position T/2).

At step 8, the adaptation controller 210 checks if the current CTLE code sequence is monotonic. If the current CTLE code sequence is monotonic, the steps 6-8 may be repeated. If the current CTLE code sequence is not monotonic, at step 9, the adaptation controller 210 freezes the previous DAC code by considering the previous DAC code as the optimized code for the convergence of the PR 208c. Thereby, ensuring that the equalization starts from the maximum value. The adaptation controller 210 swerves through the DAC codes to estimate the value of one of the cursors present in the pulse response of the channel. The steps 1-9 may be repeated until estimating and cancelling all the cursors present in the pulse response of the channel.

Figure 6A:
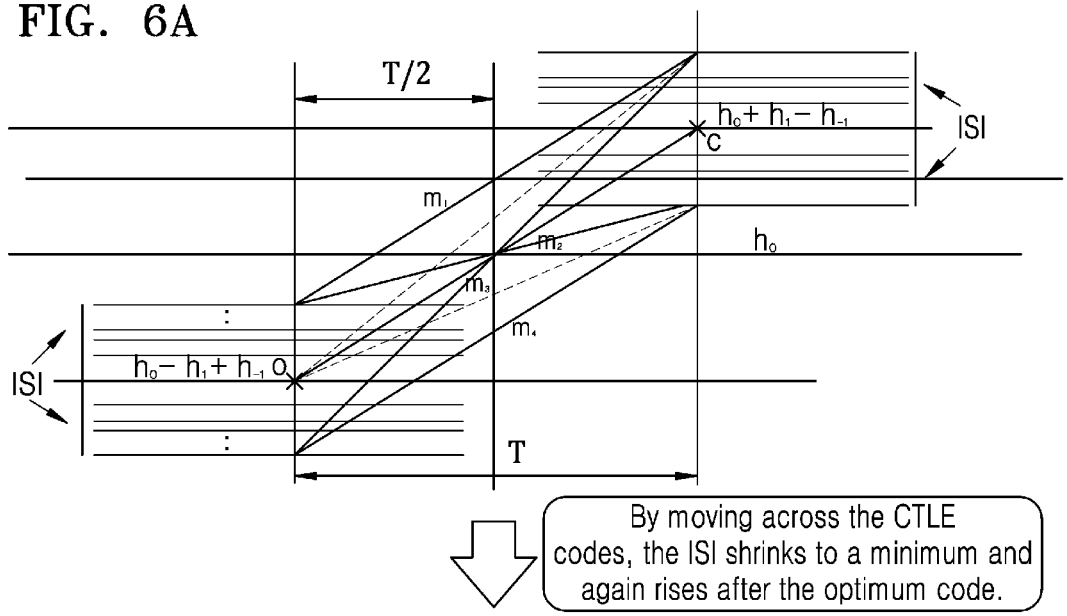
FIGS. 6a, 6b, and 6c are example plots of time and voltage crossovers of different patterns, which may be used to illustrate the digital calibration method and the PR calibration performed for estimating the cursors of the pulse response of the channel, according to embodiments as disclosed herein.
Figure 6B:
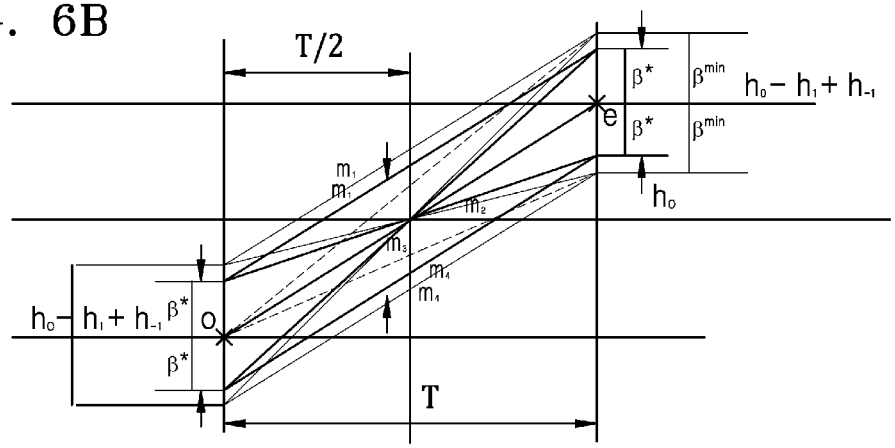
Figure 6C:
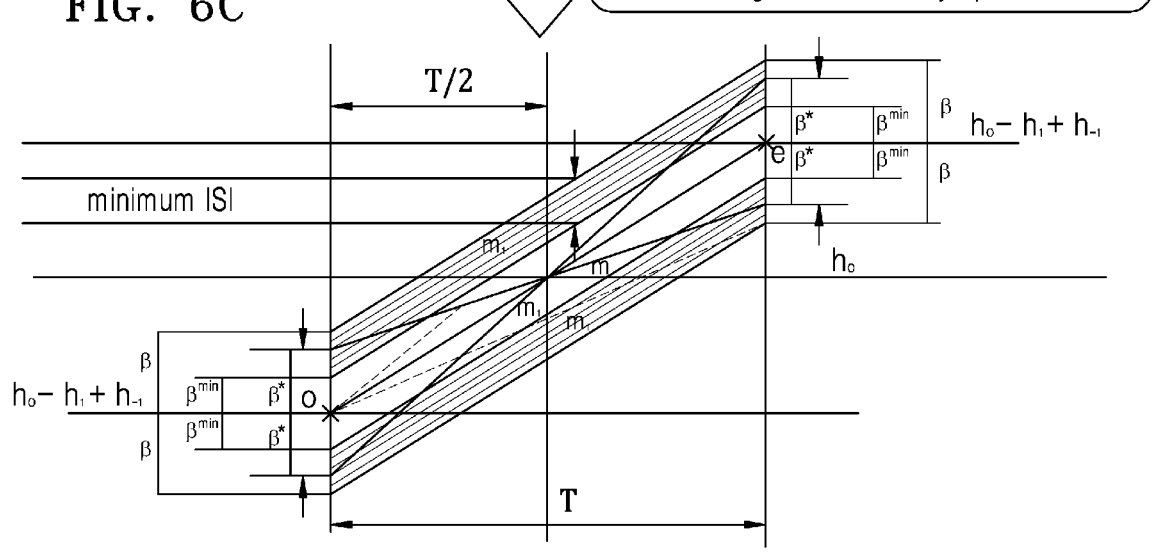

FIGS. 6a, 6b, and 6c are example plots of time and voltage crossovers of the different patterns, which may be used to illustrate the digital calibration method and the PR calibration performed for estimating the cursors of the pulse response of the channel, according to embodiments as disclosed herein.

The adaptation circuitry 102 selects the pre-known patterns for deriving information about the ISI from the received data samples. The information about the ISI may be a direct manifestation of the pulse response of the channel to the receiver 100. Once the pattern is selected, the PR 208c locks to the position based on the derived reference h$_0$, which is fed to the reference DAC 202. At the position, where the PR 208c is locked, the vertical band for the ISI (as depicted in FIG. 6a) may be detected by counting/swerving through the DAC codes.

Once the PR 208c is locked, the adaptation controller 210 decrements the CTLE codes starting from the maximum code to reduce the vertical band for the ISI at the locked position of the PR 208c, as depicted in FIG. 6b. Reducing of the vertical band for the ISI may be tracked by the DAC 202 to ensure the minimum value of the band.

As the CTLE code is decremented, the vertical band for the ISI at the converging position T/2 may reach a minimum before starting to move in the other direction, as depicted in FIG. 6c. Once, the vertical band is minimized, the CTLE code may be latched to the optimized code.

The above steps of selecting the new pattern, locking the PR 208c to a new position by changing the threshold value of the adaptation sampler, and decrementing cycle of the CTLE codes may be continued to estimate and cancel all the pre-cursors and post cursors present in the pulse response.

FIGS. 7a-7e are example diagrams depicting the pulse response of the channel and plots of the time and voltage crossovers of the patterns, which may be used to illustrate the estimation of the pulse response of the channel, according to embodiments as disclosed herein.

Figure 7A:
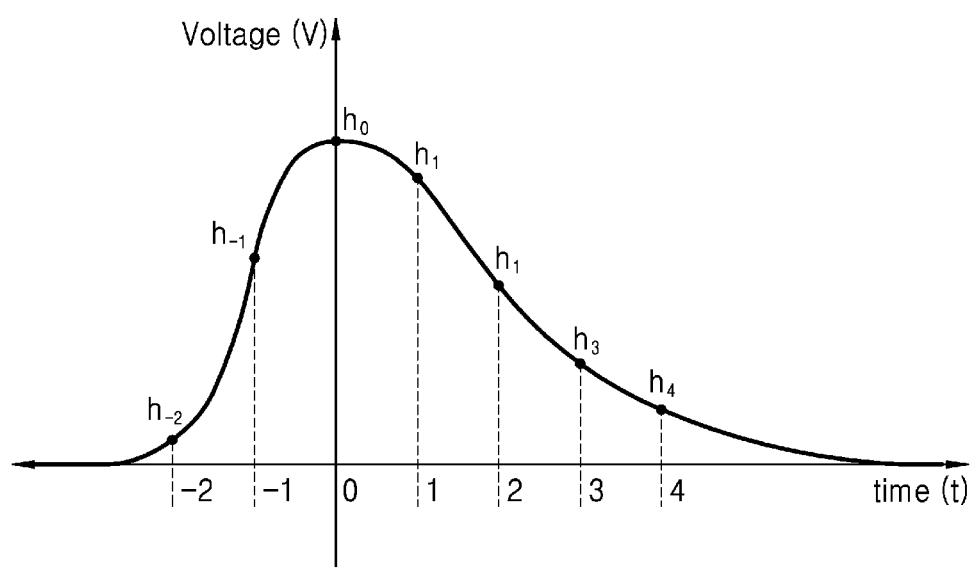
FIGS. 7a-7f are example diagrams depicting the pulse response of the channel and plots of the time and voltage crossovers of the patterns, which may be used to illustrate the estimation of the pulse response of the channel, according to embodiments as disclosed herein.

Embodiments herein enable the adaptation circuitry 102 to estimate the pulse response of the channel from the received data samples/points. An example pulse response of the channel is depicted in FIG. 7a, which includes the main cursor (h$_0$), the pre-cursors (h$_{-1}$, h$_{-2}$), and the post cursors (h$_1$, h$_2$).

Figure 7B:
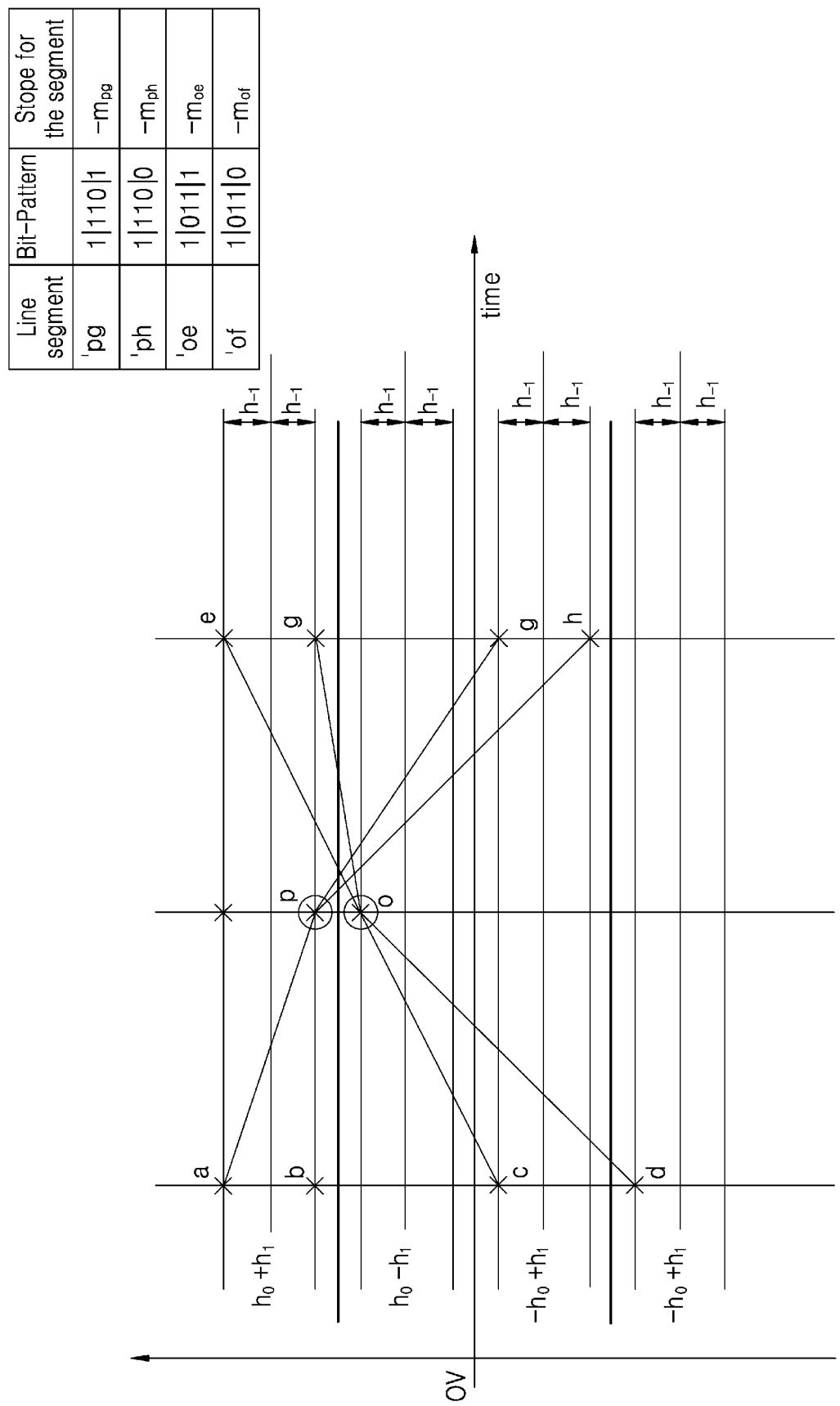
Figure 7C:
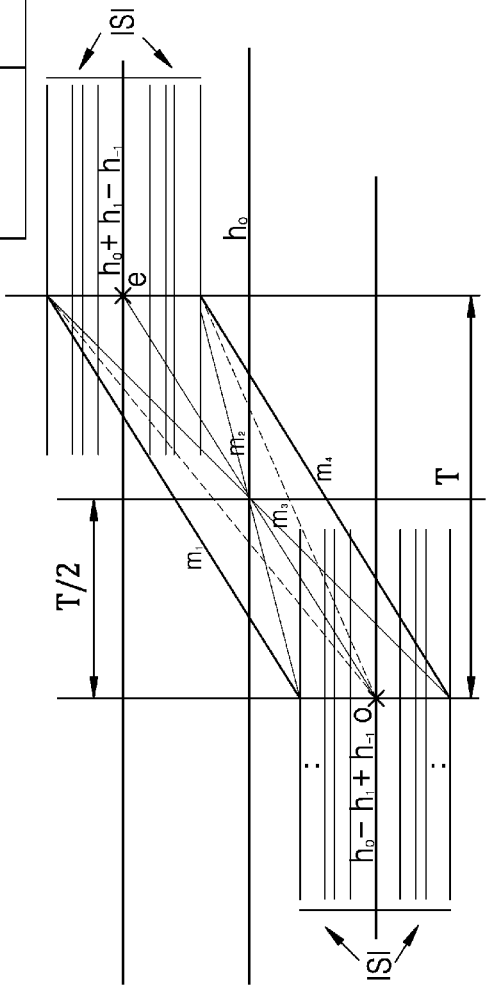
Figure 7D:
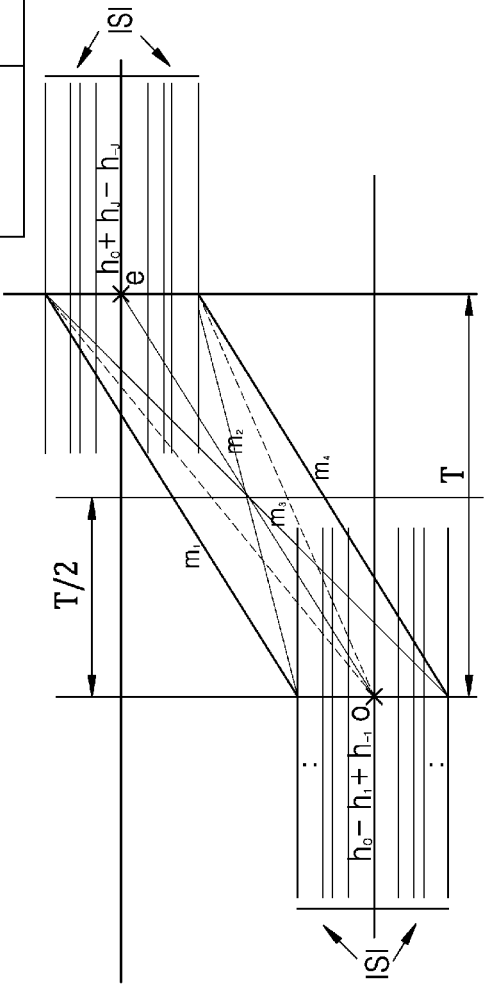
Figure 7E:
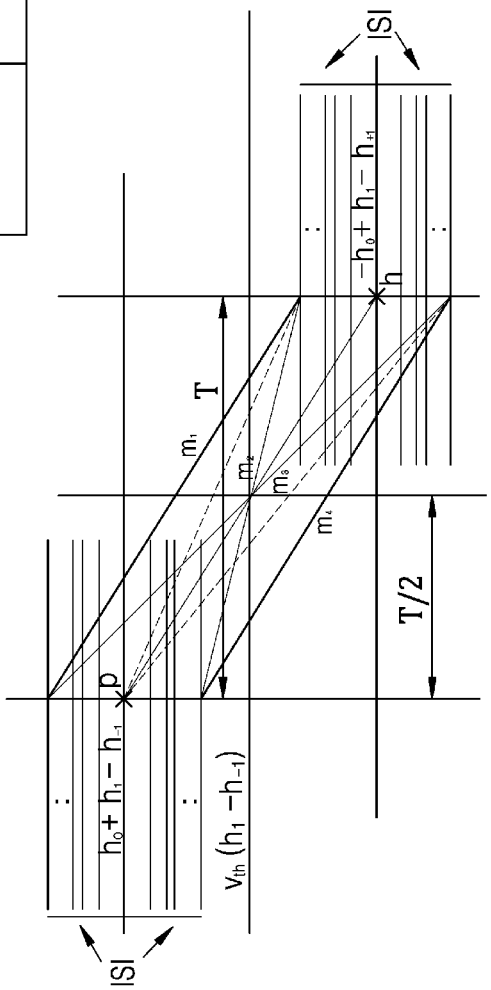
Figure 7F:
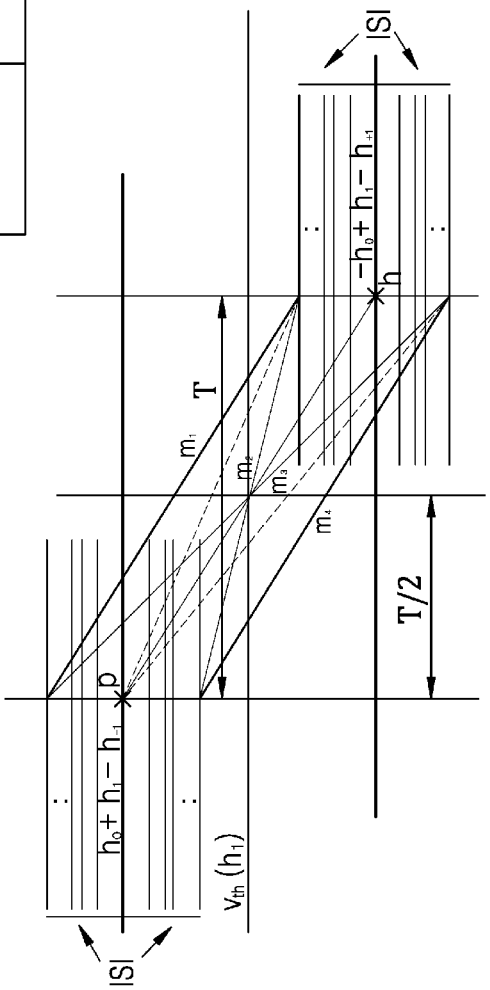

For estimating the pulse response of the channel, the pattern filter 206 selects the pattern from the pre-stored patterns for the received data sample/points. In example herein, the time and voltage crossovers between the two data points for the given channel with respect to two example patterns "011", and "110" is depicted in FIG. 7b.

In an example herein, consider that the pattern filter 206 selects an example pattern "1|011|0" for the received data points. On selecting the pattern, the DAC 202 initiates varying the threshold values of the adaptation sampler 204. The threshold value h$_0$ of the adaptation sampler 204 causes the PR 208c to converge at the position T/2. The position T/2 may be the average of the crossovers of all the data points corresponding to the threshold h$_0$, as depicted in an example plot of FIG. 7c. The adaptation sampler 210 estimates the threshold value h$_0$ which causes the PR 208c to converge at the T/2 position as the value of the main cursor (h$_0$) of the pulse response of the channel. The adaptation sampler 210 estimates the value of the main cursor by performing the digital calibration and the PR calibration, as depicted in FIGS. 3, 4a, and 4b.

On estimating the value of the main cursor, the pattern filter 206 selects an example pattern "1|011|1" for the received data points. On selecting the pattern, the DAC 202 initiates varying the threshold values of the adaptation sampler 204. The threshold value d(h$_0$+h$_{-1}$) of the adaptation sampler 204 causes the PR 208c to converge at the position T/2. The position T/2 may be the average of the crossovers of all the data points corresponding to the threshold d(h$_0$+h$_{-1}$), as depicted in an example plot of FIG. 7d. The adaptation sampler 210 estimates the threshold value d(h$_0$+h$_{-1}$) which causes the PR 208c to converge at the T/2 position as a summation of the main cursor (h$_0$) and the first pre-cursor (h$_{-1}$) present in the pulse response of the channel.

On estimating the value of the (h$_0$+h$_{-1}$), the pattern filter 206 selects an example pattern "1|110|0" for the received data points. On selecting the pattern, the DAC 202 initiates varying the threshold values of the adaptation sampler 204. The threshold value d(h$_1$-h$_{-1}$) of the adaptation sampler 204 causes the PR 208c to converge at the position T/2. The position T/2 may be the average of the crossovers of all the data points corresponding to the threshold d(h$_1$-h$_{-1}$), as depicted in an example plot of FIG. 7e. The adaptation sampler 210 estimates the threshold value d(h$_1$-h$_{-1}$) which causes the PR 208c to converge at the T/2 position as a difference between the first post cursor (h$_{-1}$) and the first pre-cursor (h$_{-1}$) present in the pulse response of the channel.

On estimating the value of the (h$_1$-h$_{-1}$), the pattern filter 206 selects an example pattern "1|110|0" for the received data points. On selecting the pattern, the DAC 202 initiates varying the threshold values of the adaptation sampler 204. The threshold value d(h$_1$) of the adaptation sampler 204 causes the PR 208c to converge at the position T/2. The position T/2 may be the average of the crossovers of all the data points corresponding to the threshold d(h$_1$), as depicted in an example plot of FIG. 7f. The adaptation sampler 210 estimates the threshold value d(h$_1$) which causes the PR 208c to converge at the T/2 position as the value of the first post cursor (h$_1$) present in the pulse response of the channel.

Figure 8:
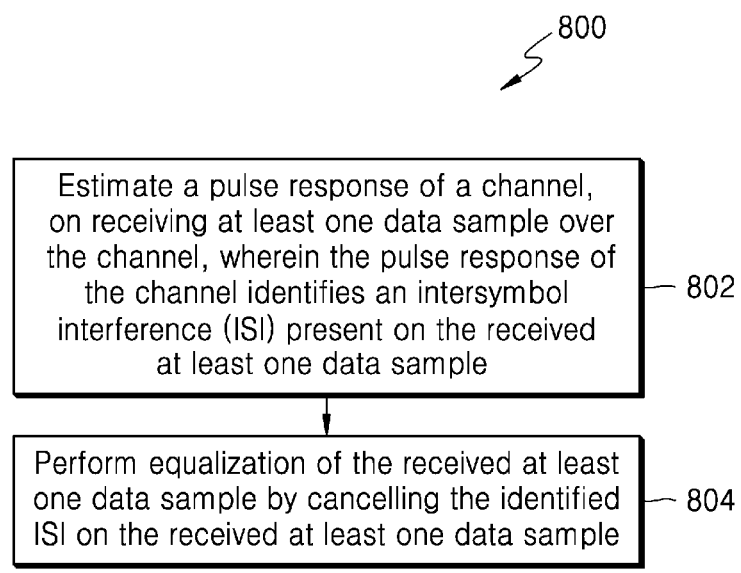
FIG. 8 is a flowchart depicting a method for performing the adaptive equalization of the data in the receiver, according to embodiments as disclosed herein.

FIG. 8 is a flowchart depicting a method 800 for performing the adaptive equalization of the data in the receiver 100, according to embodiments as disclosed herein.

At step 802, the method includes estimating, by the receiver 100, the pulse response of the channel, on receiving at least one data sample over the channel, wherein the pulse response of the channel identifies the ISI present on the received at least one data sample.

At step 804, the method includes performing, by the receiver 100, the equalization of the received at least one data sample by cancelling the identified ISI on the received at least one data sample. The various actions in method 800 may be performed in the order presented, in a different order or simultaneously. Further, in some embodiments, some actions listed in FIG. 8 may be omitted.

Figure 9:
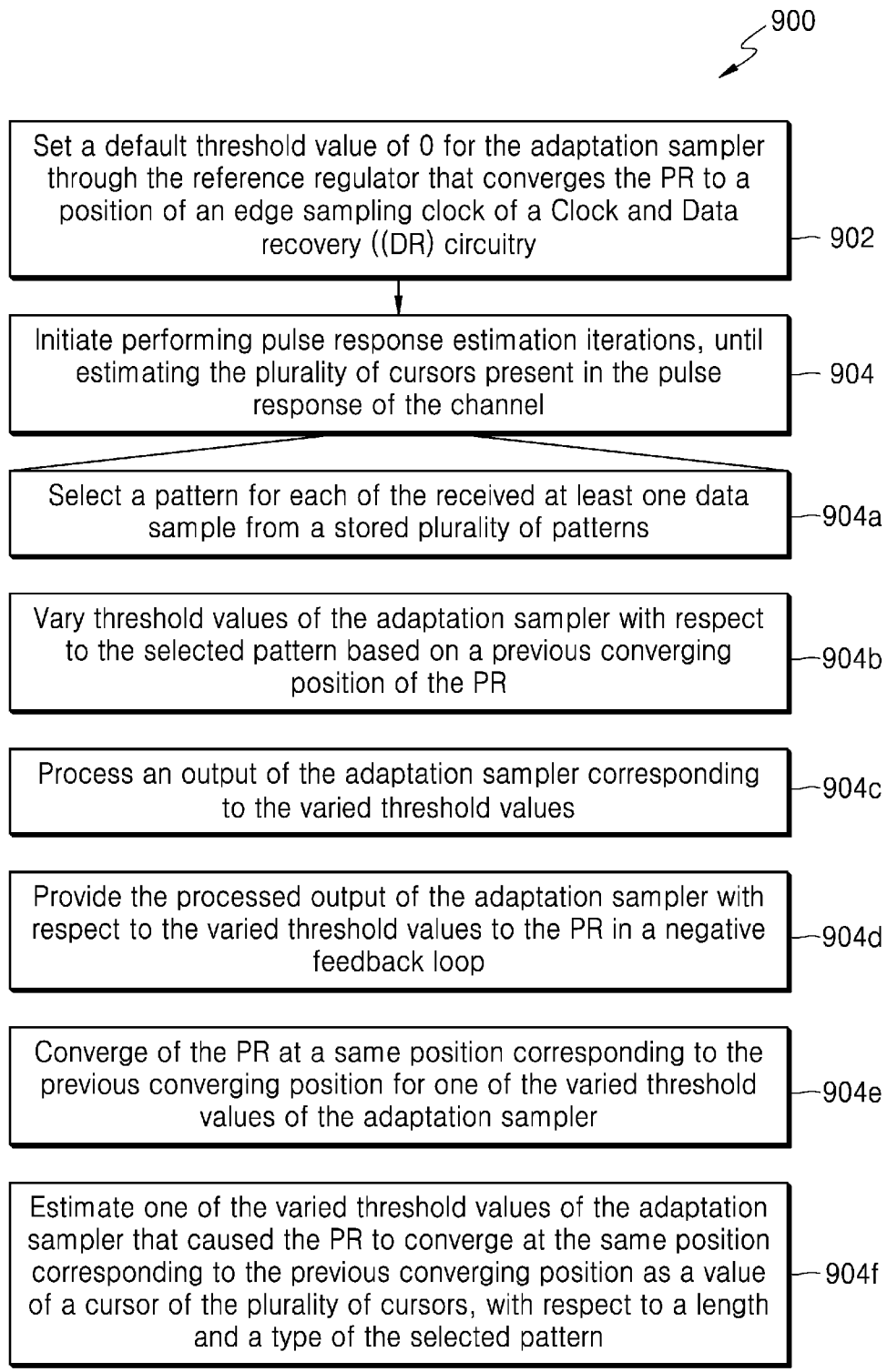
FIG. 9 is a flowchart depicting a method for estimating the pulse response of the channel, according to embodiments as disclosed herein.

FIG. 9 is a flowchart depicting a method 900 for estimating the pulse response of the channel, according to embodiments as disclosed herein.

At step 902, the method includes setting, by the receiver 100, the default threshold value of '0' for the adaptation sampler 204 through the reference regulator 202, which converges the PR 208c to the position of the edge sampling clock of the CDR circuit 208.

At step 904, the method includes initiating, by the receiver 100, performing of the pulse response estimation iterations, until estimating the plurality of cursors present in the pulse response of the channel. Each stage of pulse response estimation iteration includes steps 904a-904f.

At step 904a, the method includes selecting, by the receiver 100, the pattern for each of the received at least one data sample from the stored plurality of patterns using the pattern filter 206. At step 904b, the method includes varying, by the receiver 100, the threshold values of the adaptation sampler 204 with respect to the selected pattern based on the previous converging position of the PR 208c using the reference regulator 202.

At step 904c, the method includes processing, by the receiver 100, the output of the adaptation sampler 204 corresponding to the varied threshold values using the filter 208a. At step 904d, the method includes providing, by the receiver 100, the processed output of the adaptation sampler 204 with respect to the varied threshold values to the PR 208c in the negative feedback loop.

At step 904e, the method includes enabling, by the receiver 100, the PR 208c to converge at the same position corresponding to the previous converging position for one of the varied threshold values of the adaptation sampler 204.

At step 904f, the method includes estimating, by the receiver 100, one of the varied threshold values of the adaptation sampler 204 that caused the PR 208c to converge at the same position corresponding to the previous converging position as the value of the cursor of the plurality of cursors, with respect to the length and the type of the selected pattern. The various actions in method 900 may be performed in the order presented, in a different order or simultaneously. Further, in some embodiments, some actions listed in FIG. 9 may be omitted.

Embodiments herein derive intersymbol interference (ISI) information from data samples received at a receiver and perform an adaptative equalization of the data samples by canceling the ISI. The derived ISI information may be manifestation of a pulse response of a channel to the receiver.

Embodiments herein perform the adaptive equalization of the data samples with the following advantages:

a method of performing the adaptive equalization of the data samples by deriving the ISI information can be more accurate than a Least Mean Square (LMS) method or any other similar genre of methods across different channels;

the equalization may be performed faster compared to the LMS method or any other similar genre of method, as a Phase Rotator (PR) disclosed in the embodiments herein converge in fixed number of steps. Thereby, achieving faster lock time considering a wide spectrum of different protocols;

the method of equalization disclosed in the embodiments herein may guarantee the convergence of the PR across a wide variety of channel environments. However, in conventional approaches, Decision Feedback Equalizer (DFE) and Clock and Data Recovery (CDR) loops may interact most often to challenge convergence in variable channel environments;

the method of equalization disclosed in the embodiments herein can ensure better Bit Error Rate (BER) and Jitter tolerance for high attenuation channels at very high signaling rates;

the method of equalization disclosed in the embodiments herein does not require bulky digital signal processors to correct the ISI/cursors for the equalization. Thereby, it can ensure minimal computations as the different cursors are estimated/detected through standard circuits already present in the receiver;

a design space may be limited to a specific number of points only, that is only specific numbers may be accessible of a total search space, which further implies based on the specific design in a subset of Continuous-Time Linear Equalizer (CTLE)/DFE adaptation space is limited; and based on a nature of eye width and height, the sample/search space becomes highly directive as the sample space corresponds to the desired equalization space that gets concentrated to a handful of points only.

The embodiments disclosed herein can be implemented through at least one software program running on at least one hardware device and performing network management functions to control the elements. The elements shown in FIGS. 1, 2, and 3 can be at least one of a hardware device, or a combination of hardware device and software module.

The embodiments disclosed herein describe methods and systems for performing adaptive equalization of data. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g., Very high speed integrated circuit Hardware Description Language (VHDL) another programming language, or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the invention may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

I claim:

1. A receiver comprising:
an adaptation circuit configured to:
estimate a pulse response of a channel, on receiving at least one data sample over the channel, wherein the pulse response of the channel identifies an intersymbol interference (ISI) present on the received at least one data sample; and an equalizer coupled to the adaptation circuit configured to:
perform equalization of the received at least one data sample by cancelling the identified ISI on the received at least one data sample,
wherein the adaptation circuit is configured to estimate the pulse response of the channel by estimating a plurality of cursors present in the pulse response of the channel, wherein the plurality of cursors includes a main cursor, at least one pre-cursor, and at least one post-cursor.

2. The receiver of claim 1, wherein the adaptation circuit is configured to estimate a sign and a magnitude of each cursor present in the pulse response of the channel.

3. The receiver of claim 1, wherein the adaptation circuit comprises a reference regulator, an adaptation sampler, a pattern filter, an additional filter, a phase rotator (PR), and an adaptation controller for estimating the pulse response of the channel, wherein the reference regulator includes one of an analog regulator, and a digital regulator.

4. The receiver of claim 3, wherein:
the adaptation controller is configured to:
set a default threshold value of '0' for the adaptation sampler through the reference regulator that converges the PR to a position of an edge sampling clock of a Clock and Data recovery (CDR) circuit; and
initiate performing pulse response estimation iterations until estimating the plurality of cursors present in the pulse response of the channel, wherein at each stage of pulse response estimation iteration,
the pattern filter is configured to:
select a pattern for each of the received at least one data sample from a stored plurality of patterns;
the reference regulator is configured to:
vary threshold values of the adaptation sampler with respect to the selected pattern based on a previous converging position of the PR; the additional filter is configured to:
process an output of the adaptation sampler corresponding to the varied threshold values; and
provide the processed output of the adaptation sampler with respect to the varied threshold values to the PR in a negative feedback loop; the PR is configured to:
converge at a same position corresponding to the previous converging position for one of the varied threshold values of the adaptation sampler; and
the adaptation controller is configured to:
estimate one of the varied threshold values of the adaptation sampler that caused the PR to converge at the same position corresponding to the previous converging position as a value of a cursor of the plurality of cursors, with respect to a length and a type of the selected pattern.

5. The receiver of claim 4, wherein the pattern filter is configured to select the pattern with progressively increased pattern length from the stored plurality of patterns at each stage of pulse response estimation iteration for estimating a plurality number of post cursors and pre-cursors, wherein the pattern with the progressively increased pattern length includes progressively increased numbers of bits.

6. The receiver of claim 4, wherein the varying threshold value of the adaptation sampler corresponds to a function of the plurality of cursors present in the pulse response, wherein arguments of the function grow in proportion to the number of bits of the selected pattern due to estimating and cancelling the plurality of cursors in the pulse response from neighboring bits of a previously selected pattern.

7. The receiver of claim 4, wherein at each stage of pulse response estimation iteration, the PR is configured to always converge to the previous converging position at a unique threshold value of the adaptation sampler irrespective of the plurality of patterns.

8. The receiver of claim 4, wherein the adaptation controller is configured to identify the convergence of the PR by:
swerving through output voltage levels of the reference regulator at a sampling position and performing at least one action on the output voltage levels of the reference regulator reaching to a threshold value of the reference regulator corresponding to the selected pattern, wherein the at least one action includes at least one of, summation of the output voltage levels, and subtraction of the output voltage levels.

9. The receiver of claim 4, wherein at each stage of pulse response estimation iteration, the adaptation controller is configured to estimate progressively increasing number of cursors in the pulse response corresponding to a progressively increased pattern length with an increased resolution.

10. The receiver of claim 9, wherein the adaptation controller is configured to estimate the value of the cursor present in the pulse response of the channel using alternate cycles of reference calibration and PR calibration, wherein the reference calibration includes one of, an analog calibration method, and a digital calibration method.

11. The receiver of claim 10, wherein the adaptation controller is configured to estimate the value of the cursor based on the alternate cycles of the digital calibration method and the PR calibration by:
alternating counting through output voltage levels of the reference regulator with increment or decrement counting on at least one equalization code, wherein the at least one equalization code includes a continuous time linear equalizer (CTLE) code and decision feedback equalizer (DFE) code.

12. The receiver of claim 1, wherein the equalizer is configured to perform equalization of the received at least one data sample by:
cancelling the ISI using a combination of at least one of the CTLE code and the DFE code; or
cancelling the ISI using an analog equalization method.

13. A method for performing adaptive equalization of data, the method comprising:
- estimating, by a receiver, a pulse response of a channel, on receiving at least one data sample over the channel, wherein the pulse response of the channel identifies an intersymbol interference (ISI) present on the received at least one data sample; and
- performing, by the receiver, equalization of the received at least one data sample by cancelling the identified ISI on the received at least one data sample,
- wherein the pulse response of the channel is estimated by estimating a plurality of cursors present in the pulse response of the channel, wherein the plurality of cursors includes a main cursor, at least one pre-cursor, and at least one post-cursor.

14. The method of claim 13, wherein the pulse response of the channel is estimated by estimating a sign and a magnitude of each cursor present in the pulse response of the channel.

15. The method of claim 13, wherein estimating, by the receiver, the pulse response of the channel includes:
- through a reference regulator, setting a default threshold value of '0' for an adaptation sampler which converges a Phase Rotator (PR) to a position of an edge sampling clock of a Clock and Data recovery (CDR) circuit; and
- initiating of performing pulse response estimation iterations, until estimating the plurality of cursors present in the pulse response of the channel, wherein each stage of pulse response estimation iteration includes:
  - selecting a pattern for each of the received at least one data sample from a stored plurality of patterns using a filter;
  - varying threshold values of the adaptation sampler with respect to the selected pattern based on a previous converging position of the PR;
  - processing an output of the adaptation sampler corresponding to the varied threshold values; and
  - providing the processed output of the adaptation sampler with respect to the varied threshold values to the PR in a negative feedback loop; converging of the PR at a same position corresponding to the previous converging position for one of the varied threshold values of the adaptation sampler; and
- estimating one of the varied threshold values of the adaptation sampler that caused the PR to converge at the same position corresponding to the previous converging position as a value of a cursor of the plurality of cursors, with respect to a length and a type of the selected pattern.

16. The method of claim 15, wherein selecting the pattern at each stage of pulse response estimation iteration includes:
- selecting the pattern with progressively increased pattern length from the stored plurality of patterns for estimating a plurality of post cursors and pre-cursors, wherein the pattern with the progressively increased pattern length includes progressively increased numbers of bits.

17. The method of claim 15, wherein the varying threshold values of the adaptation sampler corresponds to a function of the plurality of cursors present in the pulse response, wherein arguments of the function grow in proportion to the number of bits of the selected pattern due to estimating and cancelling the plurality of cursors in the pulse response from neighboring bits of a previously selected pattern.

18. The method of claim 15, wherein varying the threshold values of the adaptation sampler for the selected pattern causes the PR to always converge at a unique threshold value independent of the patterns.

* * * * *